July 15, 1947.   J. W. WOHLHIETER   2,423,918
NUT OR BOLT LOCK
Filed Nov. 27, 1944   2 Sheets-Sheet 2

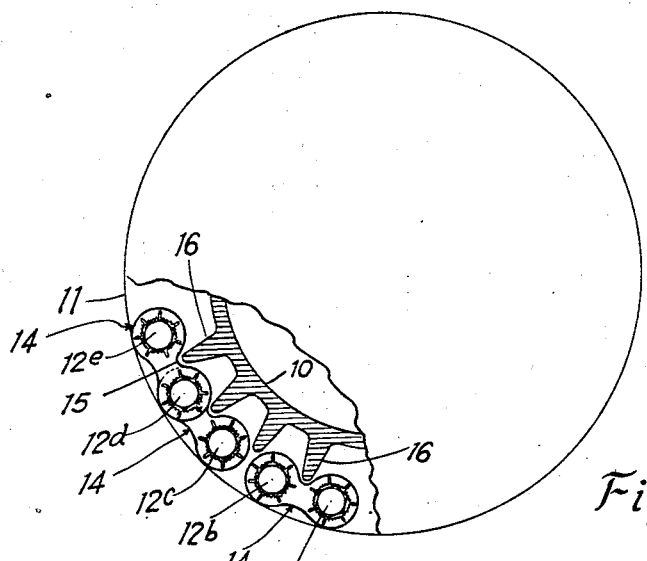
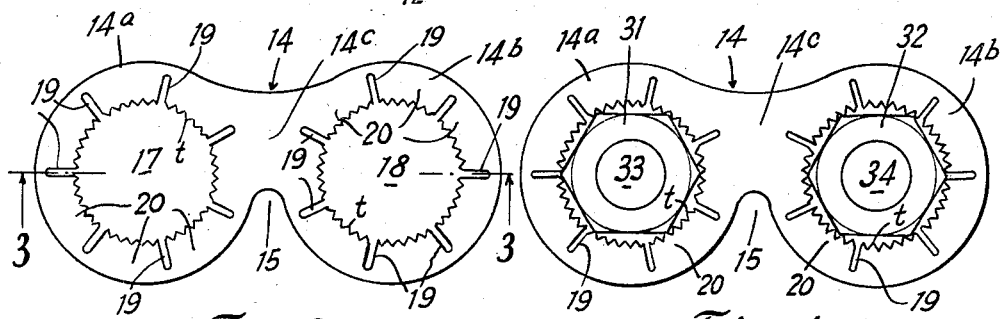
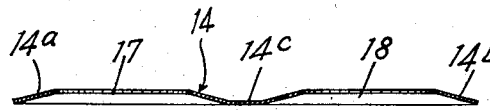
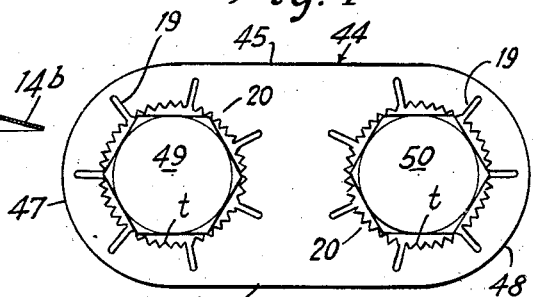
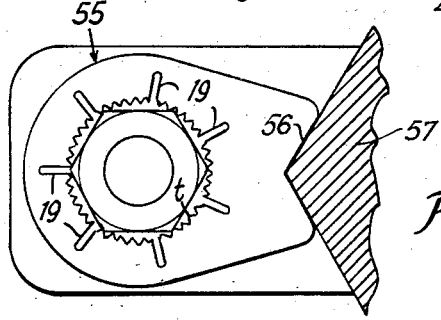

INVENTOR.
Joseph W. Wohlhieter
BY
Ramsey, Kent & Chisholm
ATTORNEYS

Patented July 15, 1947

2,423,918

UNITED STATES PATENT OFFICE 2,423,918

NUT OR BOLT LOCK

Joseph W. Wohlhieter, East Orange, N. J., assignor to The Palnut Company, Irvington, N. J., a corporation of New Jersey Application November 27, 1944, Serial No. 565,204

2 Claims. (Cl. 151—49)

This invention relates to nut or bolt locks applicable to nuts or bolts after having been screwed into firm engagement with the structure on which they are used. The invention is especially useful in compact structures such as automobile or aeroplane engines, wherein nuts or bolts are made use of in places that are difficult of access, and for safety must be set up as firmly as possible and locked against becoming loose under long continued vibration.

Many nut and bolt locks are capable of application only when the nut or bolt is in some particular angular position, which sometimes does not coincide with the position in which it is most tightly set up. This may interfere with the desired firm assembly of parts.

It is an object of my invention to provide a readily applicable locking device which may be applied to a nut, bolt, or cap-screw after it has been tightly screwed into final position without regard to its angular position of rotation.

It is also an object of my invention to provide a locking device for nuts or cap-screws which may be quickly and easily applied in positions difficult of access.

It is also an object of my invention to provide a nut- or cap-screw lock which may be applied by the simple operation of pressing it down upon the nut or cap-screw.

It is a further object of my invention to provide a nut lock applicable to a tightly screwed nut without the nut being required to be in any particular rotative position with respect to the bolt, or in any particular axial spacing with respect to the end of the bolt.

Further objects and advantages of the invention will appear as the decription proceeds.

My invention is defined in the appended claims. In the claims, as well as in the description, parts are identified by specific names for convenience, but such nomenclature is intended to be as generic, in its application to similar parts, as the prior art will permit. The best form in which I have contemplated applying my invention is illustrated in the accompanying drawing forming a part of this specification, in which:

Fig. 1 is a plan view, partly in section, showing locking members embodying the invention applied to a group of cap-screws employed in the securing of a cylinder of an internal combustion engine to a crank case.

Fig. 2 is a plan view, on a larger scale, of one of the locking members used in the assembly shown in Fig. 1.

Fig. 3 is a section on the line 3—3 of Fig. 2.

Fig. 4 is a plan view showing the locking member of Fig. 1, as applied to two nuts.

Fig. 5 is a view similar to Fig. 4, showing a modified locking member applied to two cap-screws.

Fig. 8 shows a modified form of the locking device applicable to a single nut.

Figure 7:
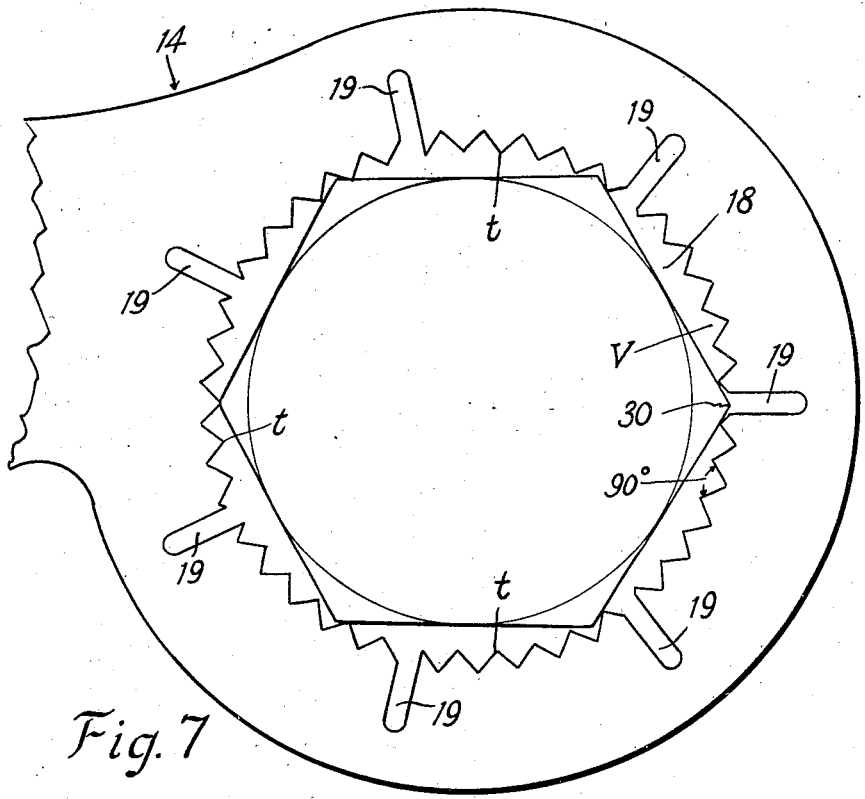
Fig. 7 is a partly diagrammatic plan view, on a still larger scale, showing details of the preferred form of the invention.
Figure 6:
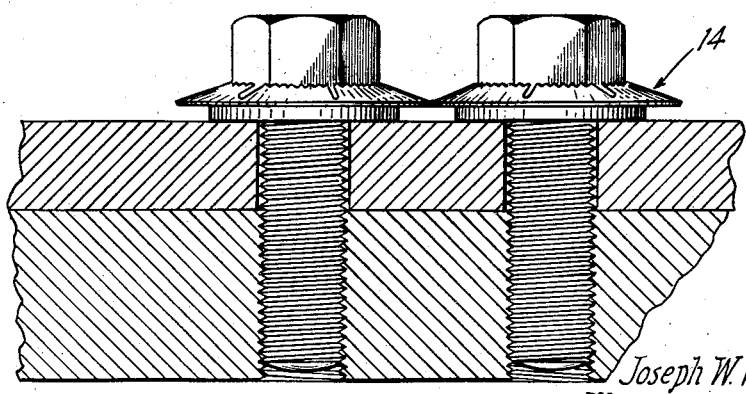
Fig. 6 is a longitudinal vertical section, partly in elevation, showing two cap screws locked by a locking member of the form shown in Figs. 1 through 4.

Reference will first be had to to Fig. 1. An air-cooled internal combustion engine cylinder 10 has a base flange 11 which is adapted to be secured to a crank case (not shown) by a circle of cap-screws, five of which are shown at 12a, 12b, 12c, 12d and 12e. The cap-screws are locked against loosening by a locking member that is common to two or more of the screws, the locking member being provided with serrated holes which are telescoped over the heads of the cap-screws. As shown the group of five cap-screws is locked by three identical sheet-like locking members, each designated as a whole by 14. One of these locking members is common to cap-screws 12a and 12b, another is common to cap-screws 12c and 12d, and the third is common to cap-screws 12d and 12e. Each locking member is cut away at 15 to provide clearance with respect to a vertical cooling fin 16 at the base of cylinder 10.

If desired, the sheet-like locking members 14 may be made longer and provided with additional serrated holes, so that one locking member may be common to any desired number of cap-screws or nuts in a series. For example, in Fig. 1 two sheet-like locking members might be used, each common to three of the cap-screws; or a single locking member might be used, common to all five of the cap-screws.

Fig. 2 shows, on a larger scale, one of the locking members 14 shown in Fig. 1. This locking member is a one-piece sheet metal stamping of spring metal. I prefer spring steel, hardened and tempered after the member 14 has been formed. The metal is so stamped as to provide a link-like piece which includes two annular portions 14a and 14b each of which merge with a connecting portion 14c. The annular portions 14a and 14b are so formed as to establish circular holes 17 and 18, the edges of which are serrated as shown. Extending radially outward from the edges of each hole are a plurality of kerfs 19, which are preferably spaced uniformly about the axis. As shown seven such kerfs are associated with each of the holes 17 and 18, so that the metal surrounding each hole is divided into seven sections or spring fingers 20.

The size and proportions of the locking member 14 are so related to the size and spacing of the pair of bolts or nuts to which it is to be applied, that the corners of the bolts or nuts are engaged in gripping fashion by the serrations at the edges of holes 17 and 18. As the locking member 14 is telescoped over the bolt heads or nuts, the fingers 20 are flexed upwardly and take a firm resilient grip on the corners of the bolt heads or nuts. This resilient gripping action firmly secures the locking member 14 in its applied position on the bolt heads or nuts; and it also holds the bolt or nut against loosening, as will be hereinafter explained more fully. The kerfs 19 are preferably long enough to give fingers 20 capacity for upward flexure, sufficient to take care of manufacturing variations in the size and spacing of holes 17 and 18 as well as in the size and spacing of the bolt heads or nuts.

While the locking member 14 may be a plane sheet metal stamping, I prefer to so form it that the metal surrounding each of the holes 17 and 18 is upwardly convex, before application to the bolts or nuts, as is shown in Fig. 3. In such form, the member 14 may be more readily telescoped onto the bolts or nuts. Also, application to the bolts or nuts is facilitated if the holes 17 and 18 be so punched that the punching burrs are on the top side of member 14; and when the burrs are on the top side they do not scratch or damage protective plating, such as cadmium plating, which may be used on the bolts or nuts. For some uses, however, the punching burrs may be on the bottom side of member 14, so that the burrs can be utilized to dig into the bolt heads or nuts, and thereby enhance the grip of the serrated edges.

The teeth at the edges of the holes 17 and 18 so interlock with the corners of the bolt head or nut as to prevent its rotation in either direction. For different specific uses and different sizes of bolt heads or nuts, the teeth may be of various degrees of fineness and may have various shapes and depths. In general, there should be a multiplicity of teeth, so that the edges of the holes 17 and 18 are finely serrated. For use with a hexagonal nut or bolt head of ½ inch nominal size I have found a satisfactory number of teeth to be 41 or 42, figured on the complete circle. Also I have found an angle of 90° satisfactory for the notches between teeth.

Referring more particularly to Fig. 7, the member 14 may first be blanked with forty-one or forty-two uniformly spaced teeth $t$ on the inside edge of each hole. Then it may be pierced to provide seven uniformly spaced kerfs 19. Used with either a hexagonal or square bolt head or nut, only one corner of the bolt head or nut can fall in a kerf 19, e. g. corner 30; and the kerf will hold this corner against substantial rotation in either direction. Each of the remaining corners of the bolt head or nut will engage the serrated edge of one of the spring fingers 20. One or more of these additional corners may exactly fall into the valley $v$ between consecutive teeth $t$, or one corner may lie against the clockwise side of one tooth while another may lie against the counterclockwise side of another tooth. In any case, however, the bolt head or nut will be effectively held against rotation in either direction.

With each tooth occupying one forty-second of the periphery of the holes 17 and 18, each corner of the bolt head or nut necessarily registers with a valley $v$ within one forty-second of a turn of the bolt or nut. However, when registration tends to be imperfect, it causes the individual spring fingers 20 to twist or cant in some measure as the device is telescoped home; and this twisting or canting effects improved registration between the valleys $v$ and some of the corners of the bolt head or nut.

Fig. 7 shows each tooth occupying one forty-first of the periphery of the hole 18. This produces a vernier relationship between the teeth of the member 14 and the corners of either a square or a hexagonal bolt head or nut. This greatly multiplies the number of rotative positions in which some one corner of the bolt head or nut will exactly coincide with a valley $v$. With a hexagonal head or nut and each valley $v$ occupying one forty-first of the periphery, some one corner will register within one two-hundred and forty-sixth of a rotation of the bolt or nut.

Fig. 4 shows how a single locking member 14 may be used to lock a pair of nuts 31 and 32 which are threaded on bolts 33 and 34 respectively.

Fig. 5 shows a locking member 44 which differs from locking member 14 only in that the sides 45 and 46 are straight and tangent to the exterior circular edges of end portions 47 and 48. In this figure the locking member is shown applied to two bolts or cap-screws 49 and 50.

In a nut lock it is essential not only that the nut lock engage the nut firmly to prevent it from rotation, but it is also necessary that the nut lock iself be held against turning. In Figs. 1, 4, 5 and 6 this is accomplished by the locking member being common to two bolts or nuts. A like result may be achieved by engaging the locking member with some stationary part.

Fig. 8 shows a nut lock for a single nut, the locking member having a portion adapted to engage adjacent stationary structure. The nut lock 55 engages the bolt or nut as previously described, and is provided with a notch 56 which interlocks with a stationary part 57 of the structure on which the nut is used. This engagement prevents the nut lock from turning relative to the structure and thus holds the nut also against rotation.

A nut and a bolt head have similar functions, viz., to transmit clamping action from a bolt shank to the object to which the bolt is applied. The lock of the present invention is usable with nuts, bolt heads, or cap screw heads; and I include all such within the expression "nut element."

What I claim is:

1. A lock for a plurality of laterally spaced nut elements, comprising: a spring sheet metal device having holes to receive the nut elements, the margin of each hole being interrupted by a series of outwardly extending cuts defining spring fingers to resiliently engage the peripheral surface of the nut element to strongly resist displacement, the margin of the hole being serrated and the metal around the hole being dished.

2. A lock for a plurality of laterally spaced nut elements, comprising: a spring sheet metal device having holes to receive the nut elements, the margin of each hole being serrated to form an edge for resiliently engaging the peripheral surface of the nut element to strongly resist displacement, and the metal around the hole being dished.

JOSEPH W. WOHLHIETER.

REFERENCES CITED

The following references are of record in the file of this patent:

UNITED STATES PATENTS

| Number | Name | Date |
|---|---|---|
| 293,295 | Agnew | Feb. 12, 1884 |
| 822,989 | Schooley | June 12, 1906 |
| 1,232,024 | Garland | July 3, 1917 |
| 2,132,825 | Lind | Oct. 11, 1938 |
| 1,125,545 | Jackson | Jan. 19, 1915 |
| 1,367,985 | Nainka | Feb. 8, 1921 |
| 2,359,555 | Herreshoff | Oct. 3, 1944 |
| 1,836,949 | Barlough | Dec. 15, 1931 |
| 2,385,777 | Ebert | Oct. 2, 1945 |
| 973,470 | Bogle | Oct. 25, 1910 |